United States Patent [19]

Goodrich, Jr. et al.

[11] 4,097,057
[45] Jun. 27, 1978

[54] INDEPENDENT SUSPENSION SYSTEM

[75] Inventors: Stanley R. Goodrich, Jr.; David J. Skolnik, both of Saginaw; Joseph A. Stearns, Frankenmuth; Robert C. Farrell; Richard R. Brezinski, both of Saginaw; Robert R. Parks, Warren, all of Mich.

[73] Assignee: General Motors Corporation, Detroit, Mich.

[21] Appl. No.: 754,280

[22] Filed: Dec. 27, 1976

[51] Int. Cl.² ........................ B60G 11/42; F16F 1/38
[52] U.S. Cl. ..................... 280/96.1; 267/57.1 A; 267/57.1 R; 267/63 A; 267/63 R; 280/662; 308/237 A; 308/237 R
[58] Field of Search ............... 280/96.1, 662, 663, 280/664, 665, 670, 671, 673, 691, 695, 696, 697, 700, 701; 308/237 R, 237 A, 238; 267/57.1 A, 57.1 R, 63 A, 63 R

[56] References Cited

U.S. PATENT DOCUMENTS

| | | | |
|---|---|---|---|
| 2,862,741 | 12/1958 | Baker | 280/96.1 X |
| 3,147,964 | 9/1964 | Wolf | 267/57.1 A |
| 3,304,136 | 2/1967 | Müller | 308/238 |
| 3,572,677 | 12/1968 | Damon | 267/57.1 R |

FOREIGN PATENT DOCUMENTS 1,253,786  1/1961  France ........................ 280/701

Primary Examiner—Joseph F. Peters, Jr.
Assistant Examiner—Donn McGiehan
Attorney, Agent, or Firm—John P. Moran

[57] ABSTRACT

An independently sprung front suspension system for improving the ride and handling of a recreational vehicle having a unitized body and frame. A wishbone-shaped lower control arm having spaced apart inner ends is mounted for pivotal movement on a control arm shaft, and a tubular member surrounding the control arm shaft is secured to the frame. A pair of spaced apart elastomeric bushings are mounted on the shaft within the tubular member which permit large horizontal deflection and minimal vertical deflection of the shaft within the tubular member during road impact and braking conditions, thereby substantially isolating the frame from such road impact. The elastomeric bushings also have their respective outermost ends contoured to prevent excessive wear thereon during such horizontal movement, and end stop washers are placed between the ends of the tubular member and the adjacent control arm ends for limiting axial and horizontal movement of the shaft and the elastomeric bushings within the tubular member and to assist in the prevention of excessive wear of the elastomeric bushings.

7 Claims, 7 Drawing Figures

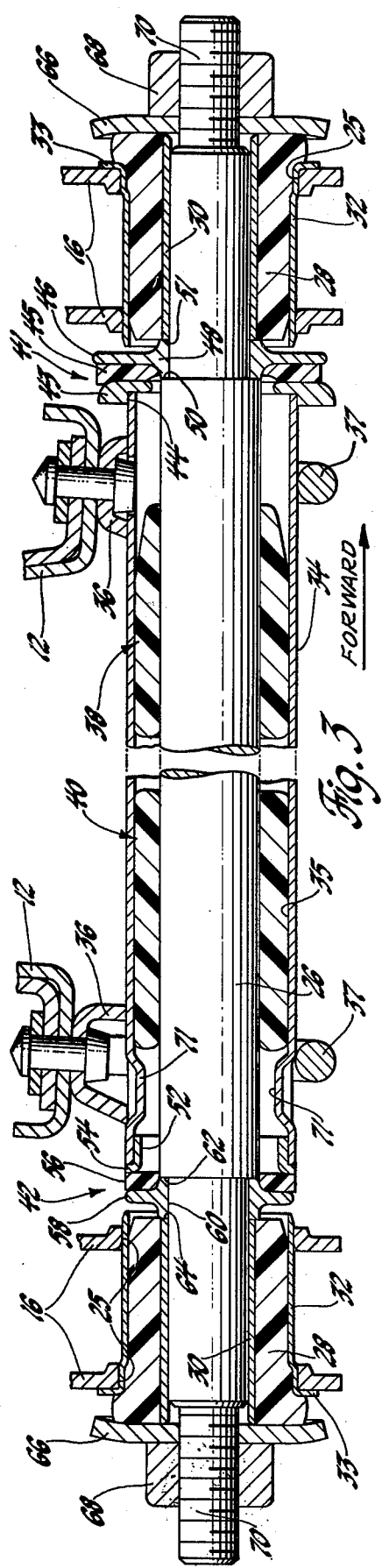
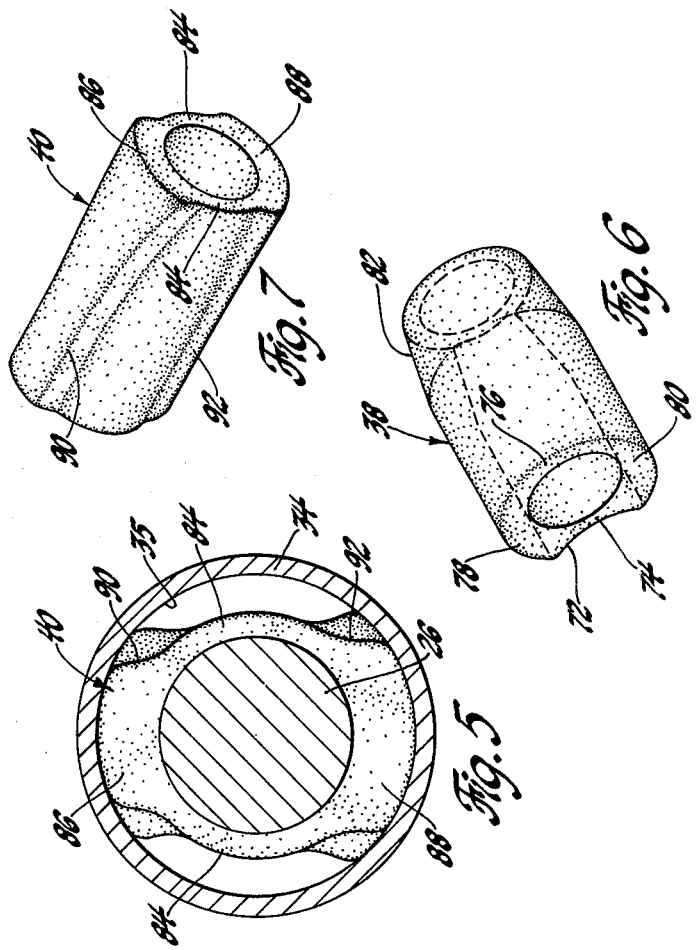
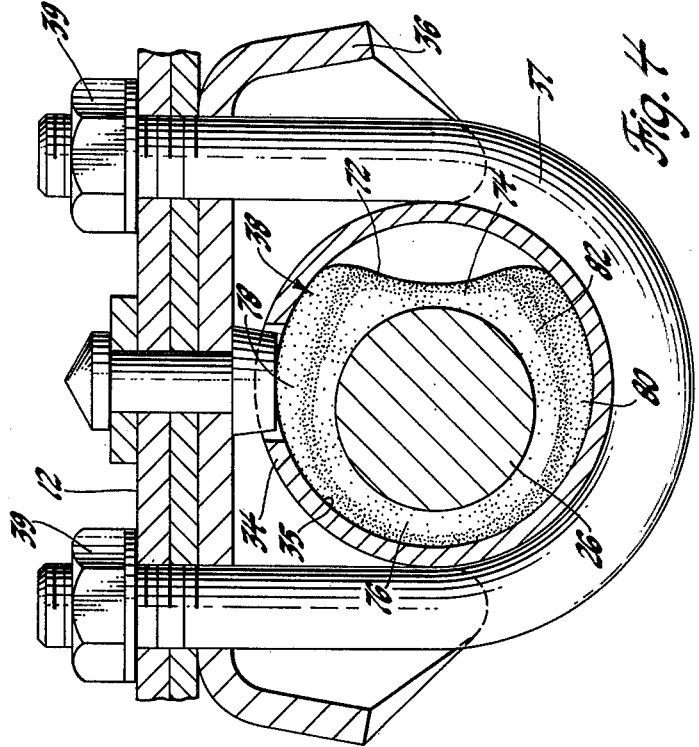

INDEPENDENT SUSPENSION SYSTEM

This invention relates generally to independent front suspension systems and, more particularly, to an improved arrangement for mounting a lower control arm to a vehicular frame.

It has been generally customary to rigidly connect the control arm shaft of a lower control arm of the type normally used on recreational vehicles to the side rails of a unitized body and frame. In order to provide improved riding characteristics for such vehicles, it has heretofore been customary to incorporate resiliently mounted frames in lieu of a unitized body and frame.

Accordingly, an object of the invention is to provide an improved, simplified, economical and efficient elastomeric isolation means for use with the lower control arm shaft of an independent front wheel suspension system on a vehicle having a unitized body and frame to improve the riding characteristics of the vehicle involved.

Another object of the invention is to provide a front suspension system, including a pair of particularly contoured and spaced elastomeric bushings for use in conjunction with tubular means having end stop means associated therewith for securing a lower control arm shaft to a vehicular frame for improved riding and characteristics when road impact loads are encountered and during braking.

A further object of the invention is to provide a front suspension system, including a combination of concentric and eccentric elastomeric bushings mounted in a spaced relationship in a tubular member securing a lower control arm shaft to a vehicular frame, the bushings each having a vertically oriented recessed side of reduced effective thickness formed on the side facing the road wheel to provide a high horizontal deflection and low vertical deflection of the lower control arm during road impact conditions, thereby isolating the frame from such impacts, and for controlling the location of the compliance center about which the horizontal deflection takes place to improve riding characteristics during braking and traveling over uneven terrain as a result of the addition of such elastomeric bushings; and elastomeric end stop means associated with the ends of the tubular member for limiting axial movement of the control arm shaft relative to the tubular member to prevent excessive wear on the elastomeric bushings.

Still another object of the invention is to provide an independently sprung front wheel assembly including a frame, a steering knuckle and associated road wheel, a control arm pivotally connected at its inner ends via shaft and an intermediate tubular member to the frame and at its outer end to the steering knuckle, a coil spring mounted between the control arm and the frame, two elastomeric bushings mounted around the shaft within the tubular member and having a vertically oriented scalloped side facing the road wheel for providing a large horizontal deflection and small vertical deflection of the control arm relative to the frame during road impact conditions to substantially isolate the frame from such impacts, the two elastomeric bushings each being selectively contoured at the end portion thereof closer to the adjacent inner end of the control arm for preventing excessive wear thereon; and stop means mounted at the ends of the tubular member for limiting lateral movement of the control arm shaft relative to the tubular member for assisting in preventing excessive wear on the elastomeric bushings.

Other objects and advantages of this invention will be more apparent when reference is made to the following description and accompanying drawings, wherein:

FIG. 3 is an enlarged cross sectional view taken along the plane of the line 3—3 of FIG. 2, and looking in the direction of the arrows;

FIGS. 4 and 5 are cross sectional views taken along the planes of the line 4—4 and 5—5, respectively, of FIG. 3, and looking in the directions of the arrows; and FIGS. 6 and 7 are perspective views of components shown in FIGS. 4 and 5, respectively.

Figure 1:
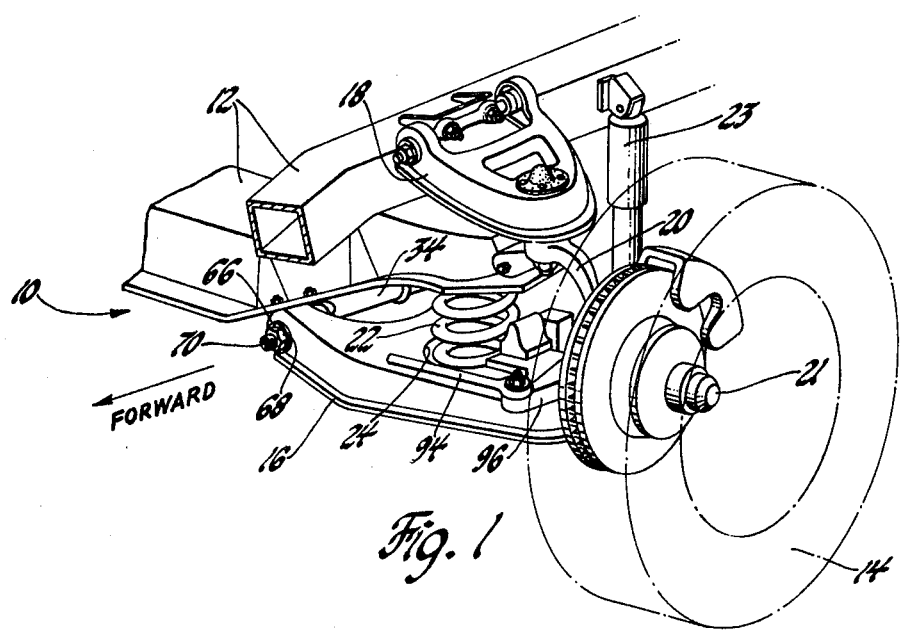
FIG. 1 is a fragmentary perspective view of an independent front suspension system embodying the invention.
Figure 2:
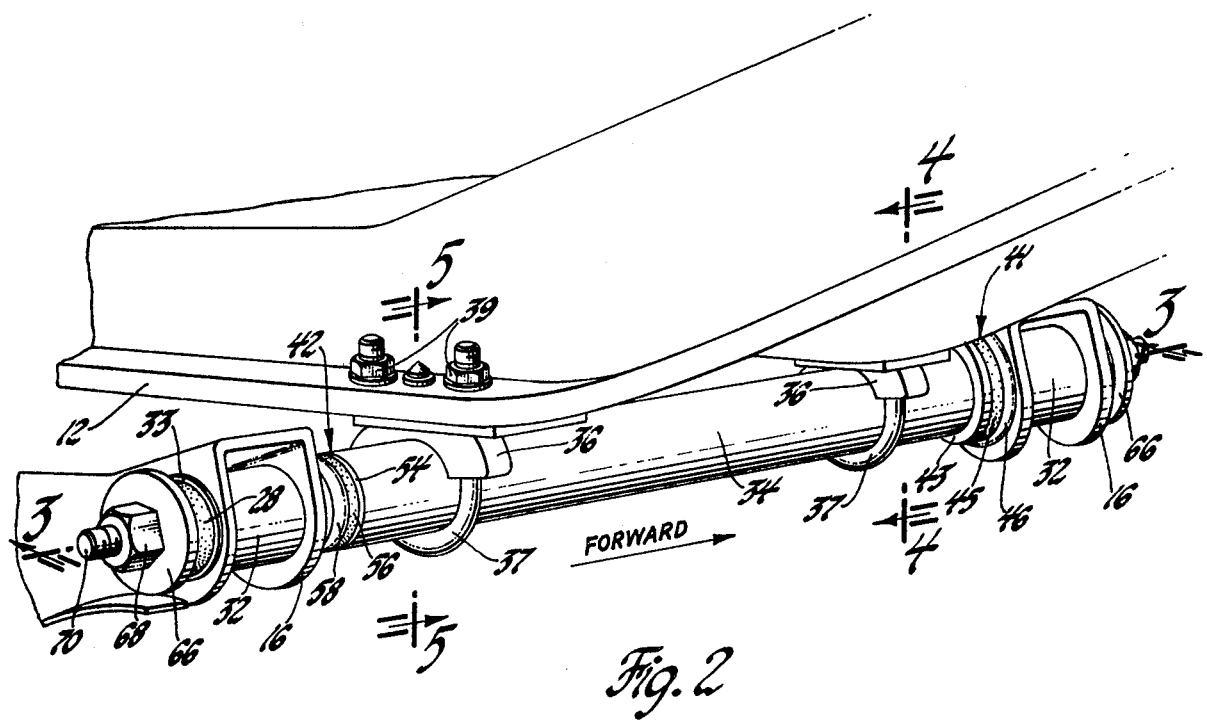
FIG. 2 is an enlarged fragmentary perspective view of a portion of the FIG. 1 structure.

Referring now to the drawings in greater detail, FIG. 1 illustrates a conventional independent front suspension system 10 operatively connected between a vehicular frame 12 and a steerable road wheel represented at 14. The suspension system 10 typically includes lower and upper wishbone or "Y" shaped control arms 16 and 18, respectively, each pivotally connected at the inner ends to the frame 12 and at the outer ends to a steering knuckle 20 at a point substantially along the vertical centerline of the road wheel 14. The wheel 14 is rotatably mounted on the spindle 21 portion of the steering knuckle 20. A coil spring 22 and a shock absorber 23 are mounted between the frame 12 and a central seat 24 and a rear side surface (not shown), respectively, of the lower control arm 16.

As may be noted in FIG. 3, the inner ends of the lower control arm 16 are elastically and pivotally supported via openings 25 on the end portions of a control arm shaft 26 by an elastomeric bushing 28 mounted within inner and outer metal sleeves 30 and 32, respectively. A flange 33 is formed on the outer end of the outer sleeve 32 to abut against the control arm 16. A tubular member 34 is mounted around the shaft 26 intermediate the respective pivotal connections of the ends of the lower control arm 16. A pair of cooperating U-shaped brackets 36 and bolts 37 (FIG. 4), and associated nuts 39, serve to secure the tubular member 34 to the frame 12. It is a feature of this invention to use a tubular member 34 which has an enlarged bore 35 formed therethrough such that a pair of elastomeric bushings 38 and 40 having shapes to be described, may be mounted between the shaft 26 and the tubular member 34. More specifically, the elastomeric bushings 38 and 40 are glued to the shaft 26 and compressed a predetermined amount by a suitable mandrel for insertion within the tubular member 34.

End stop arrangements 41 and 42 are included intermediate the ends of the tubular member 34 and the respective adjacent inner sleeve 30 of the elastomeric bushings 28. The front end stop arrangement 41 includes a flanged member 43 having a counterbore 44 formed therein and mounted on the end of the tubular member 34, an annular elastomeric bumper member 45 mounted between the flange member and a washer 46. The washer 46 includes a central hub portion 48 mounted around the shaft 26, with its end faces confined between a shoulder 50 formed on the shaft 26 and an end 51 of the inner metal sleeve 30. The rear end stop arrangement 42 includes a cylindrical restrictor 52 mounted within the other end of the tubular member 34 and having a flange 54 formed on the end thereof for mounting against the end surface of the tubular member 34. A second annular elastomeric bumper member 56 is mounted between the flange 54 of the restrictor 52 and a washer 58. The latter also has a central hub portion 60 mounted around the shaft 26 and confined between a shoulder 62 formed on the shaft 26 and an end 64 of the metal sleeve 30. A dished washer 66 and a nut 68 are mounted on each threaded end 70 of the control arm shaft 26, the washer 66 abutting against the respective outer end of the elastomeric bushing 28.

It may be noted that the outer diameter of the front end stop arrangement 41 is substantially larger than the outer diameter of the tubular member 34, whereas the outer diameter of the rear end stop arrangement 42 is substantially the same as the outer diameter of the tubular member 34. Accordingly, the shaft 26, elastomeric bushings 38 and 40, tubular member 34, and rear end stop arrangement 42 may be preassembled, and the subassembly mounted through the forward opening 25 formed in the end of the lower control arm 16. Once through the openings 25, the components 43, 45 and 46 of the front end stop arrangement 41 are mounted around the shaft 26 and against the tubular member 34, with the counterbore 44 and the hub portion 48 in place on the end of the tubular member 34 and adjacent the shoulder 50, respectively.

It is desirable for another reason that the front end stop arrangement 41 be larger than the rear end stop arrangement 42, and that is that the bumper member 45 of the former is subjected to the impact forces encountered while traveling over uneven terrain and while braking during forward vehicular motion, whereas the rear end stop arrangement is subjected to such forces while braking during the less frequent reverse vehicular motion.

As indicated, the bumper members 45 and 56 of the respective end stop arrangements 41 and 42 thus serve to cushion the rearward and forward axial movements of the control arm shaft 26 relative to the tubular member 34. It may be noted from FIG. 3 that the flanged member 43 and the cylindrical restrictor 52 of the respective end stop arrangements 41 and 42 will limit lateral movements of the control arm shaft 26 relative to the tubular member 34. Thus, it may be realized that the end stop arrangements function to prevent excessive wear on the bushings 38 and 40 and thereby, assure a satisfactory operational life span for the bushings within the tubular member 34. If desired, indentations 71 (FIG. 3) may be formed in the tubular member 34 to serve as stop means in lieu of the cylindrical restrictor 52.

Referring now more specifically to FIGS. 4 and 6, a recessed or scalloped surface 72 is formed in the outer side wall 74 of the eccentric elastomeric bushing 38, providing an effective thickness less than that of the oppositely disposed inner side wall 76. The bushing 38 is mounted on the shaft 26 and within the tubular member 34 such that the recessed or scalloped surface 72 faces the road wheel 14. The thinner elastomeric horizontal section 74, as compared to the relatively thicker top and bottom section 78 and 80 of the bushing 38, serve to provide for increased horizontal movement and minimal vertical movement of the control arm shaft 26 and the control arm 16 relative to the movement of the tubular member 34 and the frame 12 during road impact conditions. More specifically, as explained in co-pending applications, Ser. No. 745,215 filed in the names of John D. Fitzpatrick and Gary L. Smith, and Ser. No. 745,832, filed in the name of Gary L. Smith, during uneven road load and braking conditions, the force on the lower control arm 16 has both vertical and horizontal vectors, the horizontal movement being such that the forward portion of the shaft 26 within the tubular member 34 moves outwardly, forcing the thin wall 74 of the front bushing 38 through the voided are adjacent the scalloped surface 72, limited by contact of the shaft 26 with the flanged member 43, as explained above. Vertical travel of the tire and wheel 14 is absorbed by the coil spring 22, and the shock absorber 23. The high vertical compression rate of the bushing maintains the spatial relationship between the control arm shaft 26 and the frame 12.

A taper 82 (FIGS. 4 and 6) is formed on the top, bottom, and scalloped sides of the outer end portion of the bushing 38, i.e., the end closer to the adjacent end stop arrangement 41, in order to better accommodate the relative operational movements of the tubular member 34 thereagainst, and eliminate scraping snd squeezing and resultant deterioration that would otherwise occur on that end portion during operational movements of the adjacent tubular member 34.

Referring now to FIG. 7, the elastomeric bushing 40 is formed to include oppositely disposed thin side walls 84 between concentric top and bottom wall portions 86 and 88 of different arcuate lengths, the bottom wall portion 88 being the larger in order to better withstand the weight thereon through the coil spring 22 to the lower control arm 16. Tapers 90 and 92 are formed on the outer end portion of the respective top and bottom wall portions 86 and 88, i.e., the end closer to the adjacent end stop arrangement 42, serving to prevent scraping and squeezing and resultant deterioration of such end portions during the horizontal movements of the shaft 26 relative to the tubular member 34, through the voided side areas as explained above relative to the eccentric bushings 38. Movement of the outer thin side wall 84 through the adjacent void occurs during braking while operating the vehicle in reverse.

The front and rear elastomeric bushings 38 and 40 may be formed to the same or different lengths. A greater length for the rear bushing 40 is recommended to compensate for the additional loading on the rear portion of the lower control arm 16 due to the shock absorber 23 being secured to the rear side surface of the lower control arm.

Further in this regard, with a void on the back side of the rear elastomeric bushing 40 it's apparent that, during horizontal movements of the shaft 26 relative to the tubular member 34, concurrently with the outward movement of the front portion of the shaft 26, as explained above, the rear portion of the shaft 26 urges the rear wall 84 of the rear bushing 40 toward the center of the vehicle, through the adjacent void, until the shaft 26 contacts the stop members 71. The compliance center is thus located intermediate the front and rear bushings 38 and 40, depending upon the relative distances through which deflection of the shaft 26 is possible, i.e., outwardly at the front bushing 38, and inwardly at the rear bushing 40, as determined by the widths of the respective voids.

Now, as an alternate embodiment, consider the inclusion of a second eccentric elastomeric bushing 38 at the rear, in place of the bushing 40, in the same orientation as the front bushing 38, with the tubular member 34 repositioned on the frame 12 so as to maintain the shaft 26 in the same location as before. It is apparent that, with no void adjacent the back side of the rear or second bushing 38, the relatively thin rear wall 76 thereof is compressed only slightly during horizontal pivotal movement of the shaft 26, causing the compliance center to be located in the vicinity of the rear bushing, rather than at a point intermediate the bushings. Thus, depending upon the vehicular model and the particular combination of elastomeric bushings involved, the reaction at the outer end of the control arm 16 to braking and/or road impact conditions may be varied as required to compensate for brake lead or reaction at the forward end of the road wheel via the forwardly extending steering arm 96 and the connection thereto of the end of the steering linkage 94. It may be noted that brake lead is controlled to some extent, also, by the limiting of the axial movement of the control arm shaft 26 relative to the tubular member 34 by the front and rear end stop arrangements 41 and 42.

It is apparent that the invention provides an improved elastomeric isolation arrangement to supplement an otherwise conventional independent front suspension system for effectively isolating the frame from road impacts and thereby improving the ride characteristics of recreational vehicles having a unitized body and frame and a lower control arm connected thereto via a control arm shaft, and including means for maintaining a satisfactory operational life of the added elastomeric elements.

It is also apparent that the invention may be adapted to any vehicle having a separate body and frame construction.

While but two embodiments of the invention have been shown and described, other modifications thereof are possible.

What is claimed is:

1. In an independent front suspension system for a vehicle having a frame and including a wishbone-shaped control arm having an outer end mounted for pivotal movement on a steering knuckle and spaced apart inner ends each mounted around a control arm bushing including an elastomeric sleeve between outer and inner metal sleeves, the inner sleve being mounted around the end portion of a control arm shaft, a coil spring and a shock absorber mounted between the control arm and the frame, and a road wheel and tire rotatably mounted on the spindle of the steering knuckle, elastomeric isolation means comprising a pair of spaced apart elastomeric bushings secured to the control arm shaft and each having a side wall of reduced effective thickness facing the road wheel, a tubular member mounted around the elastomeric bushings with a predetermined space between the ends thereof and the adjacent inner ends of the control arm bushings, clamping means mounted around the tubular member adjacent each end thereof to secure the tubular member to the frame, a shoulder formed on each end of the control arm shaft adjacent the ends of the tubular member, and end stop means mounted on each end of the shaft between the inner metal sleeve of the control arm bushing and the shoulder and adjacent end of the tubular member to limit axial and lateral movements of the control arm shaft relative to the tubular member as determined by the horizontal distortion of the elastomeric bushings by the movement of the control arm shaft within the tubular member when the road wheel contacts uneven terrain and during braking.

2. In an independent front suspension system for a recreational vehicle having a frame and including a wishbone-shaped control arm having an outer end mounted for pivotal movement on a steering knuckle and spaced inner ends each mounted around a control arm bushing including an elastomeric sleeve between outer and inner metal sleeves, the inner sleeve being mounted around the end portion of a control arm shaft, a coil spring and a shock absorber mounted between the control arm and the frame, and a road wheel and tire rotatably mounted on the spindle of the steering knuckle, elastomeric isolation means comprising a pair of spaced apart elastomeric bushings secured to the control arm shaft, the front elastomeric bushing having a side wall of reduced effective thickness facing toward the road wheel, and the rear elastomeric bushing having side walls of reduced effective thickness facing toward and away from the road wheel, and each bushing having a tapered end portion formed on the end thereof closer to the adjacent inner end of the control arm, a tubular member mounted around the elastomeric bushings with a predetermined space between the ends thereof and the adjacent inner ends of the control arm bushings, clamping means mounted around the tubular member adjacent each end thereof to secure the tubular member to the frame, a shoulder formed on each end of the control arm shaft adjacent the ends of the tubular member, and end stop means mounted on each end of the shaft between the inner metal sleeve of the control arm bushing and the shoulder and adjacent end of the tubular member to limit axial and lateral movements of the control arm shaft relative to the tubular member as determined by the horizontal distortion of the elastomeric bushings by the movement of the control arm shaft within the tubular member when the road wheel contacts uneven terrain and during braking, said tapered end portions serving to provide clearance and thus prevent excessive wear on said elastomeric bushings.

3. In an independent front suspension system for a recreational vehicle having a unitized body and frame and including a wishbone-shaped control arm having an outer end mounted for pivotal movement on a steering knuckle and spaced apart inner ends each mounted around a control arm bushing including an elastomeric sleeve between outer and inner metal sleeves, the inner sleeve being mounted around the end portion of a control arm shaft, a coil spring and a shock absorber mounted between the control arm and the frame, and a road wheel and tire rotatably mounted on the spindle of the steering knuckle, elastomeric isolation means comprising a pair of spaced apart elastomeric bushings secured to the control arm shaft and each having a side wall of reduced effective thickness facing the road wheel, a tubular member mounted around the elastomeric bushings with a predetermined space between the ends thereof and the adjacent inner ends of the control arm bushings, clamping means mounted around the tubular member adjacent each end thereof to secure the tubular member to the frame, a shoulder formed on each end of the control arm shaft adjacent the ends of the tubular member, and end stop means mounted on each end of the shaft and including a flanged metal member abutted against the adjacent end of the tubular member, a metal ring having a hub confined between the inner metal sleeve and the shaft shoulder, and an elastomeric ring mounted between the flanged metal member and the metal ring, for limiting axial and lateral movements of the control arm shaft relative to the tubular member as determined by the distortion of the elastomeric bushings within the tubular member when the road wheel contacts uneven terrain and during braking.

4. In an independent front suspension system for a recreational vehicle having a unitized body and frame and including a wishbone-shaped control arm having an outer end mounted for pivotal movement on a steering knuckle and spaced apart inner ends each mounted around a control arm bushing including an elastomeric sleeve between outer and inner metal sleeves, the inner sleeve being mounted around the end portion of a control arm shaft, a coil spring and a shock absorber mounted between the control arm and the frame, and a road wheel and tire rotatably mounted on the spindle of the steering knuckle, elastomeric isolation means comprising a pair of spaced apart elastomeric bushings secured to the control arm shaft and each having a predetermined side wall of reduced effective thickness facing the road wheel, a tubular member mounted around the elastomeric bushings with a predetermined space between the ends thereof and the adjacent inner ends of the control arm bushings clamping means mounted around the tubular member adjacent each end thereof to secure the tubular member to the frame, a taper formed on the outermost end portion of each of the elastomeric bushings so as to provide a predetermined clearance relative to the inner surface of the tubular member and thereby prevent excessive squeezing and accompanying deterioration of the bushings during relative movements of the control arm shaft and the tubular member, and elastomeric end stop means mounted on each end of the shaft between the inner metal sleeve of the control arm bushing and the adjacent end of the tubular member to limit axial and lateral movements of the control arm shaft relative to the tubular member as determined by the horizontal distortion of the elastomeric bushings resulting from the movement of the control arm shaft within the tubular member when the road wheel contacts uneven terrain.

5. In an independent front suspension system for a recreational vehicle having a unitized body and frame and including a wishbone-shaped control arm having an outer end mounted for pivotal movement on a steering knuckle and spaced apart inner ends each mounted around a control arm bushing including an elastomeric sleeve between outer and inner metal sleeves, the inner sleeve being mounted around the end portion of a control arm shaft, a coil spring and a shock absorber mounted between the control arm and the frame, and a road wheel and tire rotatably mounted on the spindle of the steering knuckle, elastomeric isolation means comprising front and rear spaced apart elastomeric bushings secured to the control arm shaft, the front bushing being eccentric in shape and having an arcuate cut-out formed in the side wall thereof facing the road wheel, the rear bushing being concentric in shape and having predetermined contoured surfaces formed in both side walls thereof, a tubular member mounted around the elastomeric bushings with a predetermined space between the ends thereof and the adjacent inner ends of the control arm bushings, clamping means mounted around the tubular member adjacent each end thereof to secure the tubular member to the frame, a shoulder formed on each end of the control arm shaft adjacent the ends of the tubular member and elastomeric impact means mounted on each end of the shaft between the inner metal sleeve of the control arm bushing and the shoulder and adjacent end of the tubular member to limit axial and lateral movements of the control arm shaft relative to the tubular member as determined by the horizontal distortion of the elastomeric bushings by the movement of the control arm shaft within the tubular member when the road wheel contacts uneven terrain and during braking.

6. In an independent front suspension system for a recreational vehicle having a unitized body and frame and including a wishbone-shaped control arm having an outer end mounted for pivotal movement on a steering knuckle and spaced apart inner ends each mounted around a control arm bushing including an elastomeric sleeve between outer and inner metal sleeves, the inner sleeve being mounted around the end portion of a control arm shaft, a coil spring and a shock absorber mounted between the control arm and the frame, and a road wheel and tire rotatably mounted on the spindle of the steering knuckle, elastomeric isolation means comprising a pair of spaced apart elastomeric bushings secured to the control arm shaft, the front bushing being eccentric and having a contoured cut-out formed in the side thereof facing the road wheel and a taper formed on the top and bottom surfaces and on the side facing the road wheel of the outermost end portion thereof, the rear bushing being concentric and having a contoured voided portion formed symmetrically in each side wall thereof and a taper formed on the edges of the top and bottom wall portions of the outermost end portions thereof, a tubular member mounted around the elastomeric bushings with a predetermined space between the ends thereof and the adjacent inner ends of the control arm bushings, clamping means mounted around the tubular member adjacent each end thereof to secure the tubular member to the frame, and end stop means mounted on each end of the shaft between the inner metal sleeve of the control arm bushing and the adjacent end of the tubular member to limit axial and lateral movements of the control arm shaft relative to the tubular member as determined by the horizontal distortion of the elastomeric bushings resulting from the movement of the control arm shaft within the tubular member when the road wheel contacts uneven terrain and during braking.

7. In an independent front suspension system for a recreational vehicle having a unitized body and frame and including a wishbone-shaped control arm having an outer end mounted for pivotal movement on a steering knuckle and spaced apart inner ends each mounted around a control arm bushing including an elastomeric sleeve between outer and inner metal sleeves, the inner sleeve being mounted around the end portion of a control arm shaft, a coil spring and a shock absorber mounted between the control arm and the frame, and a road wheel and tire rotatably mounted on the spindle of the steering knuckle, elastomeric isolation means comprising a pair of spaced apart elastomeric bushings secured to the control arm shaft, the front bushing being eccentric and having a contoured cut-out formed in the side thereof facing the road wheel and a taper formed on the top and bottom surfaces and on the side facing the road wheel of the outermost end portion thereof, the read bushing being concentric and having a contoured voided portion formed symmetrically in each side wall thereof and a taper formed on the edges of the top and bottom wall portions of the outermost end portions thereof the bottom wall portion having a larger arcuate length than the top wall portion to better withstand the additional weight thereon through the coil spring, a tubular member mounted around the elastomeric bushings with a predetermined space between the ends thereof and the adjacent inner ends of the control arm bushings, clamping means mounted around the tubular member adjacent each end thereof to secure the tubular member to the frame, a shoulder formed on each end of the control arm shaft adjacent the ends of the tubular member, and end stop means mounted on each end of the shaft between the inner metal sleeve of the control arm bushing and the shoulder and adjacent end of the tubular member to limit axial and lateral movements of the control arm shaft relative to the tubular member as determined by the horizontal distortion of the elastomeric bushings resulting from the movement of the control arm shaft within the tubular member when the road wheel contacts uneven terrain and during braking.

* * * * *